United States Patent
Simpson et al.

(10) Patent No.: US 11,067,377 B2
(45) Date of Patent: Jul. 20, 2021

(54) DEVICE AND METHODS FOR ACCOUNTING FOR ENVIRONMENTAL CAPACITANCES CAUSED BY AN EXTERNAL OBJECT WHEN DETECTING PRESENCE AND LOCATION OF SURFACE COATINGS ON TRANSPARENT AND/OR TRANSLUCENT MEDIUM

(71) Applicant: EDTM, Inc., Toledo, OH (US)

(72) Inventors: Jeffrey A. Simpson, Wayne, NE (US); Mark A. Imbrock, Sylvania, OH (US); Nathan Strimpel, Milan, MI (US); Jed Martens, Wayne, NE (US)

(73) Assignee: EDTM, Inc., Toledo, OH (US)

( * ) Notice: Subject to any disclaimer, the term of this patent is extended or adjusted under 35 U.S.C. 154(b) by 32 days.

(21) Appl. No.: 16/357,815

(22) Filed: Mar. 19, 2019

(65) Prior Publication Data

US 2019/0293403 A1    Sep. 26, 2019

Related U.S. Application Data

(60) Provisional application No. 62/645,357, filed on Mar. 20, 2018.

(51) Int. Cl.
   *G01B 7/06* (2006.01)
   *G01N 27/24* (2006.01)

(52) U.S. Cl.
   CPC .............. *G01B 7/085* (2013.01); *G01N 27/24* (2013.01)

(58) Field of Classification Search
   CPC ........ G01B 7/085; G01B 7/023; G01B 7/003; G01N 27/24; G01R 27/2605
   See application file for complete search history.

(56) References Cited

U.S. PATENT DOCUMENTS

| | | | | |
|---|---|---|---|---|
| 4,571,543 A | * | 2/1986 | Raymond | G01N 27/227 257/414 |
| 5,132,631 A | * | 7/1992 | Klopfenstein | G01B 7/085 324/663 |
| 7,652,760 B1 | * | 1/2010 | Simpson | G01N 21/8422 356/239.1 |
| 8,723,944 B1 | * | 5/2014 | Imbrock | G01B 11/0625 348/87 |
| 2012/0236388 A1 | * | 9/2012 | De Wind | G02B 5/04 359/267 |
| 2016/0069667 A1 | * | 3/2016 | Strimpel | G01B 11/0633 356/632 |

* cited by examiner

*Primary Examiner* — Nasima Monsur (74) *Attorney, Agent, or Firm* — MacMillan, Sobanski & Todd, LLC (57) ABSTRACT

A device for accounting for environmental capacitances caused by an external object when detecting the presence and surface location of an electrically conductive coating on a transparent and/or translucent medium includes: a capacitive sensor that provides multiple capacitances; electronics that are responsive to the capacitances; an excitation source that generates a train of pulses, voltage or current to determine capacitances at the capacitive sensor; a selective indicator; and, a capacitive sensing plate that affects, or is affected by, the pulses, voltage or current from the excitation source.

17 Claims, 10 Drawing Sheets
(10 of 10 Drawing Sheet(s) Filed in Color)

DEVICE AND METHODS FOR ACCOUNTING FOR ENVIRONMENTAL CAPACITANCES CAUSED BY AN EXTERNAL OBJECT WHEN DETECTING PRESENCE AND LOCATION OF SURFACE COATINGS ON TRANSPARENT AND/OR TRANSLUCENT MEDIUM

RELATED APPLICATIONS

This application claims priority to U.S. Application Ser. No. 62/645,357 filed under 35 U.S.C. § 111(b) on Mar. 20, 2018, the disclosure of which is incorporated herein by reference in its entirety.

TECHNICAL FIELD

This invention relates to a device and a method for detecting the presence and location of coatings on a surface of a transparent and/or translucent medium.

BACKGROUND

It is often helpful in the glass industry, as well as other transparent medium industries, to detect the presence and surface location of coatings that are applied to the surface of glass (for example, Low E) coatings. These coatings are typically not visible and therefore difficult to detect without electronic assistance.

Klopfenstein et al. U.S. Pat. No. 5,132,631, is a prior art device for detecting the presence and surface location of an electrically conductive coating on a sheet of glass that includes a capacitive probe for positioning against a sheet of glass. However, the '631 device does not deal with the issue that capacitance (which is the ability to store charge) is affected by everything interacting with the electric field that exists between the prior art device and the entire system ground.

Imbrock et al. U.S. Pat. No. 8,723,944 (owned by the same applicant as the present application) provides a device that compensates for signal changes over distances.

However, neither the '631 nor '944 patents recognizes that the total working environment is polarized by the existing electrical field, which leads to an increase or offset in capacitance that is measured.

Therefore, there is a continuing need for an improved, reliable and efficient method and device to detect the presence, location and type of coating applied to various media.

BRIEF SUMMARY OF THE INVENTION

This invention generally relates to a capacitive-sensing device for detecting conductive coatings on one or more surfaces of non-conductive mediums where important and necessary improvements to signal resolution and signal quality occur when the capacitive interaction with the surrounding environment is taken into account.

For example, the capacitive-sensing device is useful for detecting the presence and surface location of or the absence of an electrically conductive solar coating on a pane of glass. In another non-limiting example, the capacitive-sensing device is useful for detecting the presence and surface location of or the absence of LOWE coatings on a medium.

The capacitive-sensing device includes:

a capacitive sensor (that is to be placed against a surface of the medium);

an indicator configured to be responsive to the first, second, third or fourth capacitances detected by the capacitive sensor;

an excitation source which produces a pulse train, current or voltage that is determined by the first, second or capacitances at the sensor;

a selective indicator that is responsive to the capacitive change which selectively indicates the presence and location or the absence of an electrically conductive glass surface coating; and, a capacitive sensing plate configured to sufficiently affect the capacitive sensor negatively or positively by a sufficient amount in order to differentiate locations of the coating. In the embodiment shown, the sensing plate is an isolated conductive plate.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

PRIOR ART

DETAILED DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

General Description

The system described herein is useful to readily and accurately detect conductive coatings on one or more surfaces of non-conductive mediums. Non-limiting examples of such measurable media include, for example, but are not limited to one or more of: architectural windows with or without coatings or layers of light-altering materials; coated films on glass or plastics; glass such as automobile windows, adjustable darkness glass, user adjustable privacy glass, eyeglass lenses; plastics such as windows, storage containers; and, transparent metal layers such as those found in photovoltaic devices and solar panels.

In the coating industry, there also are numerous applications where coatings are applied to a transparent surface. Some of these applications include flat glass, windows, LCD screens, solar cell panels, thermal efficient films, as well as many other plastic and glass applications. During the processing of these flat materials, it is often desirable to have a device that is able to detect the presence and location of the "invisible" coatings. The coatings may be located on one or both surfaces of a single piece of the medium, or on one or more surfaces of multiple pieces of the medium materials built into an assembly, separated by a known transparent media such as air or a gas.

Described herein is a detection system that is now capable of identifying both: i) presence or absence of a coating, and ii) and, if a coating, is present whether such coating is on a near or far side of one or more mediums. The detection system is especially useful with many different types of products and is capable of making accurate measurements concerning the conductive coatings on such mediums.

It is to be understood that various suitable algorithms or mathematical techniques for generating and/or processing any final result output signal can be used. Further, the detection system may be controlled and/or operated by conventional control and/or operational systems, including, but not limited to various software instructions and/or programs. It is to be understood that such instructions and programs are readily available to, or readily programmable, without undue experimentation from the descriptions as provided herein. It is to be understood that the detection system described herein can be used with one or more software programs which include calibration data that compare all possible combinations of single and/or multi-pane glass assemblies. By having this data stored in the software, the system described herein can accurately detect and/or measure work across a greater variance in glass and gap combinations.

Figure 1A:
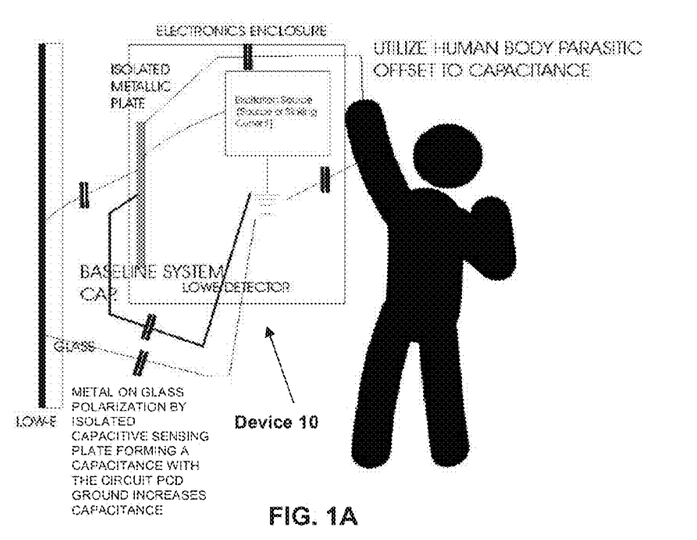
FIG. 1A: Schematic illustration of how a capacitive-sensing device described herein utilizes a human body's parasitic capacitance offset.

In certain embodiments, the isolated conductive/sensing plate comprises a single or multiple plates that affect (or, are affected by) a known current, voltage or frequency source that, in turn, will form an electrical field between the isolated conductive(sensing) plate within the capacitive-sensing device and the device's ground. The ground is isolated from the conductive plate and a field is formed between them. The ground may be beside, around or behind the isolated capacitive sensing plate. An electrical field is formed that is dependent upon the location and distance of the system ground from the isolated capacitive conductive plate. Any item that enters the electrical field including the enclosure, human hand etc. interacts with that field. The ground includes any plate areas, traces, battery wires etc. that return to the voltage source that is being used to form the electrical field Detailed Description FIG. 1A provides a schematic illustration of how such capacitive-sensing device 10 utilizes human body's parasitic capacitance that is formed with the system.

Figure 2:
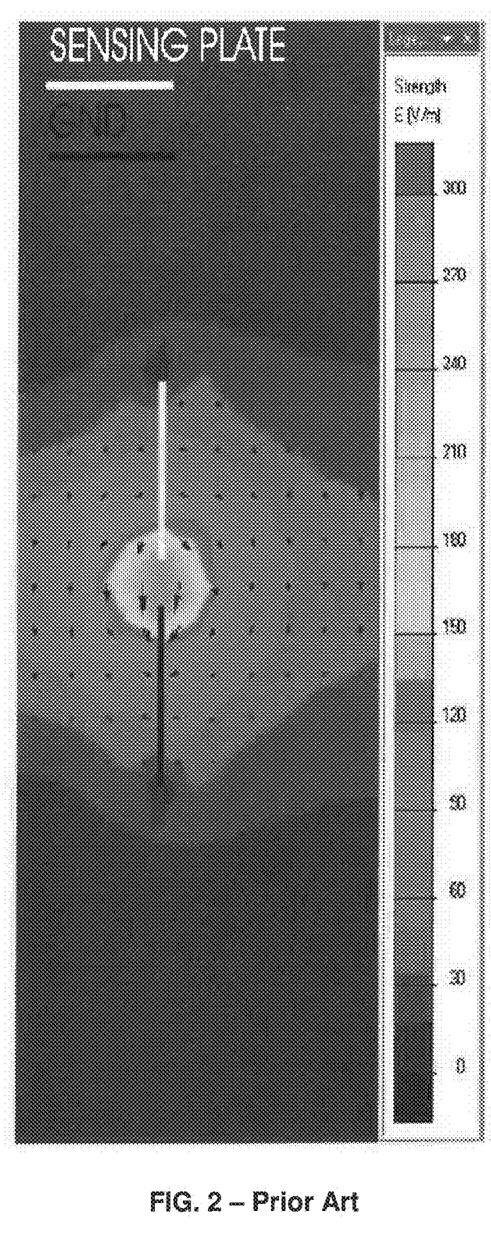
FIG. 2: Image showing strength E (V/m) for a capacitive-sensing device 10, which incorporates everything in the area near the capacitive-sensing device that is reachable from the device's electric field.

The capacitive-sensing device 10 compensates for the capacitive field (e.g., as shown in FIG. 2) that will interact with the electronics of the capacitive-sensing device 10, the user, or anything else in the surrounding environment that is on an opposite side of the capacitive-sensing device.

The capacitive-sensing device 10 described herein generally detects the presence and/or location of coatings applied to various transparent mediums/materials, where such coating(s) is deposited directly to a surface of the transparent mediums during the manufacturing process (such as glass or plastic), and where such coating(s) may be on a single sheet of the medium and/or multiple spaced sheets of the medium.

Figure 1B:
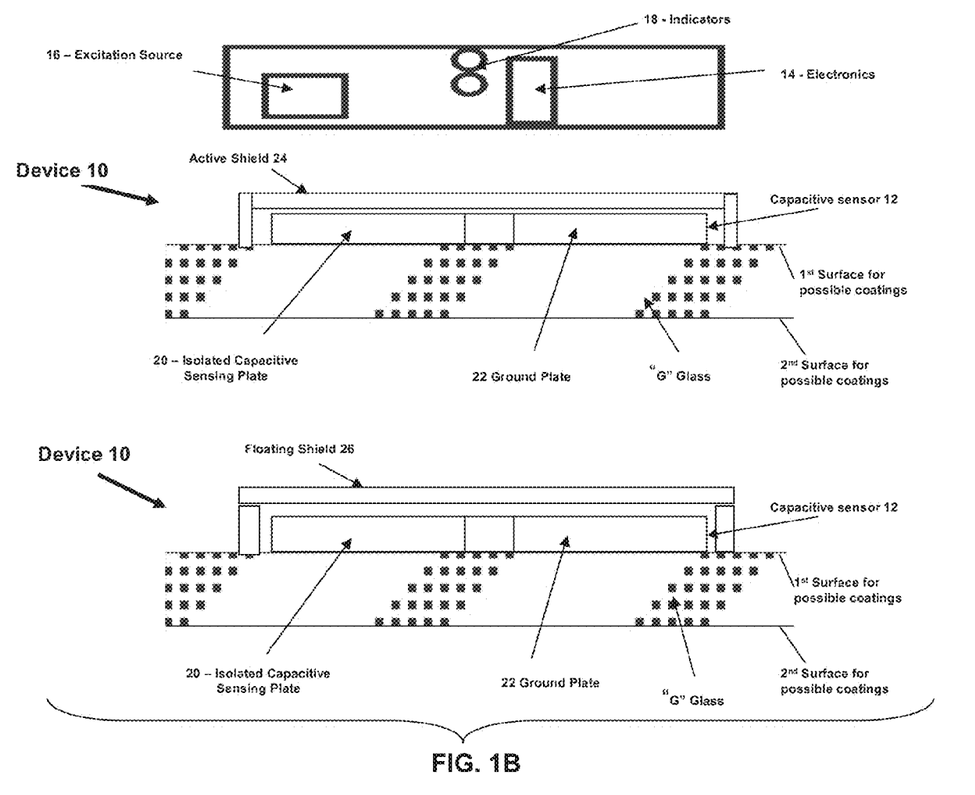
FIG. 1B: Schematic illustration of one embodiment of a capacitive-sensing device, showing from top-to-bottom: plan view, cross-sectional illustrations; and, cross-sectional illustration of a capacitive-sensing device, in use against a coated medium.

FIG. 1B shows schematics illustration of the capacitive-sensing device 10 for detecting the presence and surface location of an electrically conductive coating on a sheet of medium, such as a glass "D".

The capacitive-sensing device 10 generally includes a capacitive sensor 12 that is configured for being positioned against a surface of the glass "G." The capacitive sensor 12 provides at least: a first capacitance in the absence of a conductive coating on the glass; a second capacitance if a conductive coating is present on a far side of the glass surface, and a third capacitance if a conductive coating is present on a near side of the glass surface; and, a fourth capacitance if the device is contacting the coating on a nearest surface of the medium.

The capacitive-sensing device 10 has indicator electronics 14 (such as a printed circuit board having circuitry and ground traces) that are operatively connected to the capacitive sensor 12. The indicator electronics 14 are configured to be responsive to the first/second/third/etc. capacitances that are detected by the capacitive sensor 12.

The capacitive-sensing device 10 has an excitation source or sink 16 that is configured to generate a train of electrical pulses, voltage or current. Such train of pulses/voltage and/or current are then used for determining one or more of the first/second/third/fourth/etc. capacitances at the capacitive sensor 12.

The capacitive-sensing device 10 has a selective indicator 18 that is responsive to the capacitive change. The selective indicator 18 is configured to indicate the presence and location (or, the absence of) an electrically conductive glass surface coating.

The capacitive-sensing device 10 also includes an capacitive sensing plate 20 which affects the capacitive sensor 12 (either negatively or positively) in order to sufficiently differentiate locations of the coating on single, dual, triple pane windows. In certain embodiments, the capacitive sensing plate 20 has a size (e.g., larger than a standard push button) that can cover most of the surface area of the capacitive sensor 12.

The capacitive-sensing device 10 also includes a ground system 22.

In use, the present capacitive sensor 12 receives a known current and/or voltage source that, in turn, will form an electrical field between the capacitive sensing plate 20 and the ground system 22. This electrical field forms a baseline capacitance value. Once the device 10 is held or confined by a user, as shown in FIG. 1, additional capacitance will be formed between the user's hand and body back to the ground, thereby affecting the total capacitance measured between the capacitive sensing plate 20 and the ground system 22 (which will be different from baseline capacitance then the value found in air alone).

The capacitive sensing plate 20 is connected to the excitation source 16 such that the electrical force from the excitation source 16 supplies charge to the capacitive sensing plate 20 and forms an electrical field between the ground system 22—which is could be a ground plate and any other ground traces from the corresponding electronics that may be located behind the capacitive sensing plate 20 and the ground system 22 on the opposite side of the printed circuit board (pcb) or another attached pcb.

Consequently, a balancing charge will form on the isolated plate (20) and the (22) ground plate, traces etc. (e.g., the traces on the electronic circuit printed circuit board) that are reached by the electrical field.

As more charges join the capacitive sensing plate 20 and the ground system 22 and any other ground traces on the other side of the pcb or any other associated electronics 16 which is connected to the capacitive sensing plate 20, these charges build up an electric field that oppose any further increase in charge density. Eventually, the positive and negative charges will equalize, and the capacitive sensing plate 20 and ground system 22 will be in equilibrium. This is when the capacitive sensing plate 20 and the ground system 22 have the same potential difference as the excitation source 16, and the capacitance (which is defined as the ability of a body to store an electric charge) will have reached its maximum.

If the human holder of the device 10 is placed in the electric field and cuts the electrical lines of force, such action will affect the system capacitance. The electric field polarizes the object (human holder) that holds the device 10, and energy is transferred to the polarized charges. The polarized charges get energy from the plates (capacitive sensing plate 20 and the ground system 22) such that the plates (capacitive sensing plate 20 and the ground system 22) now have a lower potential.

If the excitation source 16 is still connected, more charges will be added to the capacitive sensing plate 20 and the ground system 22 until the plates (capacitive sensing plate 20 and the ground system 22) have the same potential difference as the excitation source 16. The external object allows more charge to be stored on the plate, and therefore the external object increases the overall system capacitance due to polarization of the object entering the preexisting electrical field.

Thus, even when the external object is not physically connected to any of the plates, the external object is still capable of influencing the capacitance by polarizing the object. All of this works because the electrical field from the capacitive sensing plate 20 will emanate in all directions as it seeks to return to ground. That is, the electrical field that is formed between a conductive plate 20 or trace and the ground system 22 is affected by the holder of the device.

This capacitive-sensing device 10 utilizes the pre-existing electric fields to polarize the transparent mediums along with everything else within the electric field, thus affecting the electric field and allowing for the determination of the presence and location of conductive coatings. That is, the capacitive system may include any part of the surrounding environment and does not require a piece of glass to be present to form a "first" capacitance. Such "first" capacitance is then used to determine trigger values that will define the location and presence of conductive coatings on a transparent medium. These trigger values may be calibrated with or without the transparent medium being present.

In certain embodiments, as shown in FIG. 1B, the capacitive-sensing device 10 includes a fixed voltage plate shield 24 so that a known fixed offset capacitance is formed, such that the sensing direction is directed out away from a user's hand, and is instead directed to the glass and into a window assembly that has coatings.

In certain embodiments, the active shield 24 is positioned at the back side of the capacitive sensing plate 20 or conductive trace (e.g., on the circuit board of the indicator electronics 14) which is actively driving the capacitive sensing plate 20 and the ground system 22. In one embodiment, a shield 24 can be independently driven to imitate the isolated actively driven plate 20. If the shield 24 and the capacitive sensing plate 20 have the same voltage potential then an electrical field is not formed between them.

Therefore, the shield 24 will be at the same voltage as the positively charged capacitive sensing plate 20 or conductive traces; thus limiting electrical field interaction between the independently driven shield and the actively driven sensing plate, and limiting the interaction of the electrical field past the shield and reducing shifts due to temperature, humidity that are cause by the passive shield method. Here, sensing Capacitance=plate created capacitance.

Again referring to FIG. 1B, in certain embodiments, the capacitive-sensing device 10 also includes a floating shield 26 that is positioned at a back surface of the capacitive sensor 12, such that the usable sensing direction is away from a user's hand, and the usable direction to the glass and into a window assembly that has the coatings. The floating shield 26 can be in a position around the capacitive sensor 12 such that the capacitive-sensing device 10 can significantly remove the effects of the human body that affect the electric field back to the capacitive sensor 12 and that affect the readings.

Certain embodiments of the device can include a return ground location near the capacitive sensing plate 20 or trace, along with an active shield 24, fixed voltage shield and/or a floating shield 26.

It is to be understood that, in certain embodiments the shield 24 and the floating shield 26 can both be a floating shield. That is, an active shield that seeks to imitate the capacitive sensing plate 20 to match that voltage or a fixed voltage which matches the voltage that is applied to the capacitive sensing plate 20 or a ground shield 24 or floating shield 26. All shields will reduce the effect of the hand or person holding the device. However, in certain embodiments, it is preferred that shields are floating, active shields or a fixed voltage shield are around, within, behind or near the capacitive sensing plate 20. Ground shields form a capacitance that are large compared to the capacitance that is being formed and the electronics must have the range to handle this condition.

The return path of electrical field can be shorter to the ground plate then to any other location in the electronics; thereby reducing the effect, and increasing the sensing distance and resolution of the location of a semi-conductive coating. The sensing electrical field that causes polarization of the transparent medium under test essentially stays on the side of the transparent medium in question and not the side holding the device. The interaction with an existing field will cause an increase in capacitance and shift the baseline system capacitance higher. Here, sensing capacitance=plate created capacitance and any capacitance between the plate, shield and ground.

FIG. 2 provides an image showing strength E (V/m)) which incorporates everything in the capacitive area that is reachable from an electric field. Since the field emanates in all directions, an enclosure or a human hand would enter the electrical field. If the field interaction is constant (as a plastic enclosure in FIG. 2), the software or electrics are configured to subtract this effect from an actual reading—so that when a medium under test has entered the field, the remaining result would be dependent only upon the medium under test.

When using a capacitive-sensing device 10 to detect the presence/absence of a coating, the total environment is polarized by the existing electrical field which leads to an increase in capacitance that is measured by the capacitive sensor 12. A new baseline electrical field is actually formed between "the entire system" ground and the capacitive sensor 12 and any traces that connect to the capacitive sensor 12. Therefore, a "true first" capacitance is formed from the capacitive sensor, enclosure, the entire system ground and any method used to hold the device. For example, there is a difference between when a user holds the Klopfenstein et al. '631 device against the glass, as compared to when the Klopfenstein et al. '631 device is not being held. That is, the clear glass being measured may now have a higher capacitance than the capacitance found on a glass with a semi-conductive coating, thus giving inaccurate measurements. The Klopfenstein et al. '631 device does not recognize that the human body affects the readings of their design greatly.

Figure 3:
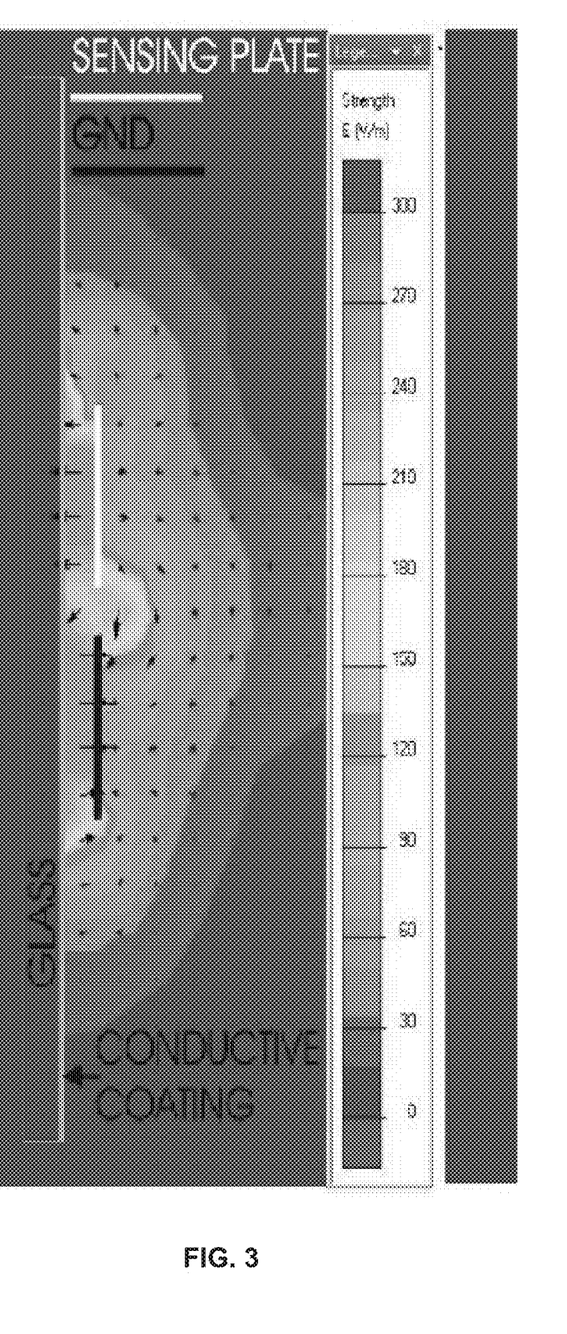
FIG. 3: Image showing strength E (V/m) for a capacitive-sensing device placed against a transparent medium with a Low E coating, with electric fields emanating in all directions, where the device is not held by anything.

FIG. 3 provides an image showing strength E (V/m)) for a capacitive-sensing device 10 in air, with electric fields emanating in all directions, where the capacitive-sensing device 10 is not held by anything and the electrical field distance is limited by the conductive coating on one side of the sensing plate.

Referring now to FIGS. 4A-4B and 5A-5B, then the device 10 is thin or small (e.g., 0.03 inches), use of the device 10 may be difficult for the human hand to hold the device, thus forcing the user to hold the device against the test surface only by a finger, etc. In such cases, effect of the human body on the system capacitance is reduced significantly. Therefore, any new change to the field by having a semi-transparent medium with the possibility of a semi-conductive coating on the medium will be the cause of the increase in capacitance; and not the polarizing effects of the holder of the handheld device affecting the systems electrical field. This capacitance then may be calibrated or linked by distance thereby locating the semi-conductive coating.

Figure 4A:
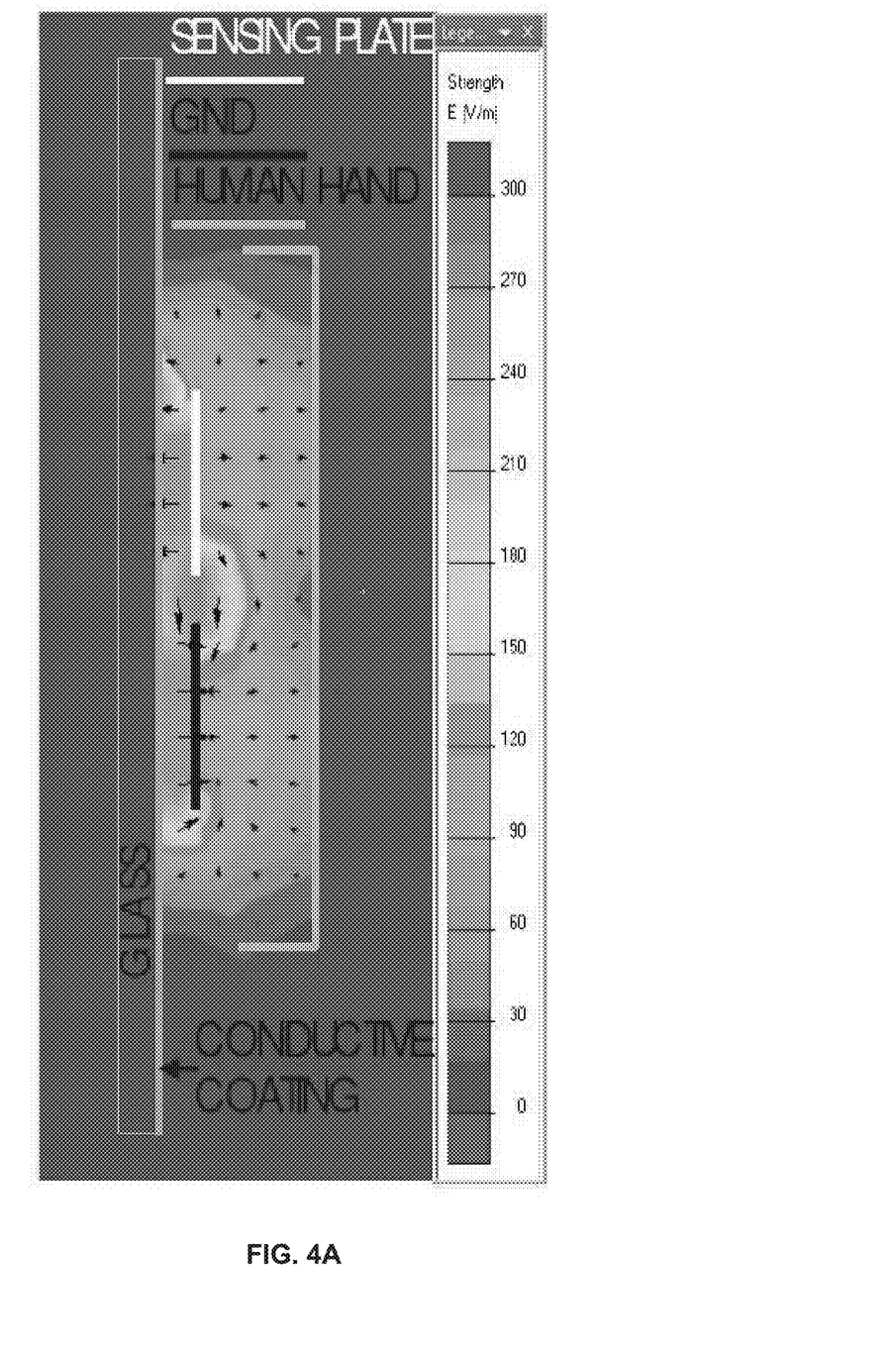
FIG. 4A: Image showing strength E (V/m) for a capacitive-sensing device where a hand is held around the capacitive-sensing device.
Figure 4B:
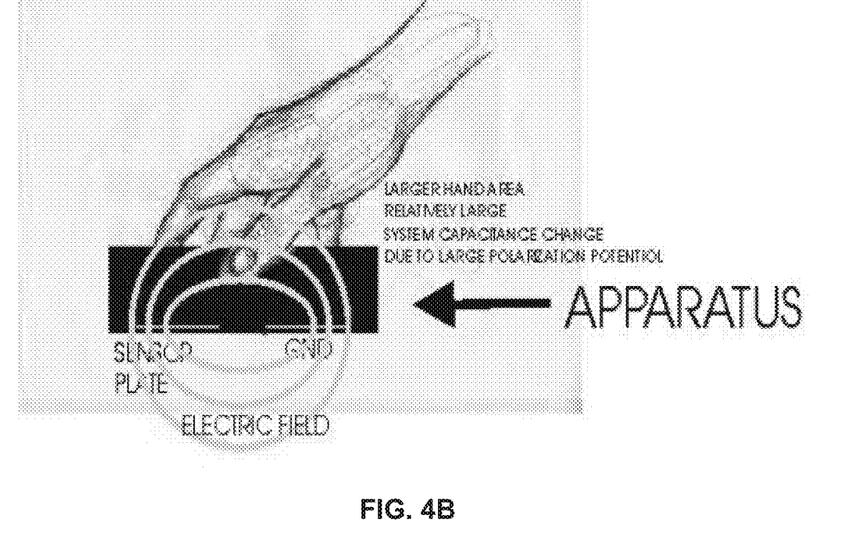
FIG. 4B: Schematic illustration of a hand held around a capacitive-sensing device, showing how the hand effects the capacitive-sensing device where a larger hand area causes a relative large system capacitance change due to the hand being polarized and forming a capacitive relationship with the system.

FIG. 4A shows an image showing strength E (V/m) where a hand is held around the capacitive-sensing device 10, showing how the hand affects the capacitive-sensing device 10. The polarizing of the hand increases the charging on the capacitive sensing plate 20 and any traces to such plate, along with increasing electrical charge on the ground system 22 and any system ground traces. FIG. 4B is a schematic illustration of a hand held around a capacitive-sensing device 10, showing how the hand affects the capacitive-sensing device 10 where a larger hand area causes a relative large system capacitance change due to a large polarization change.

Figure 5A:
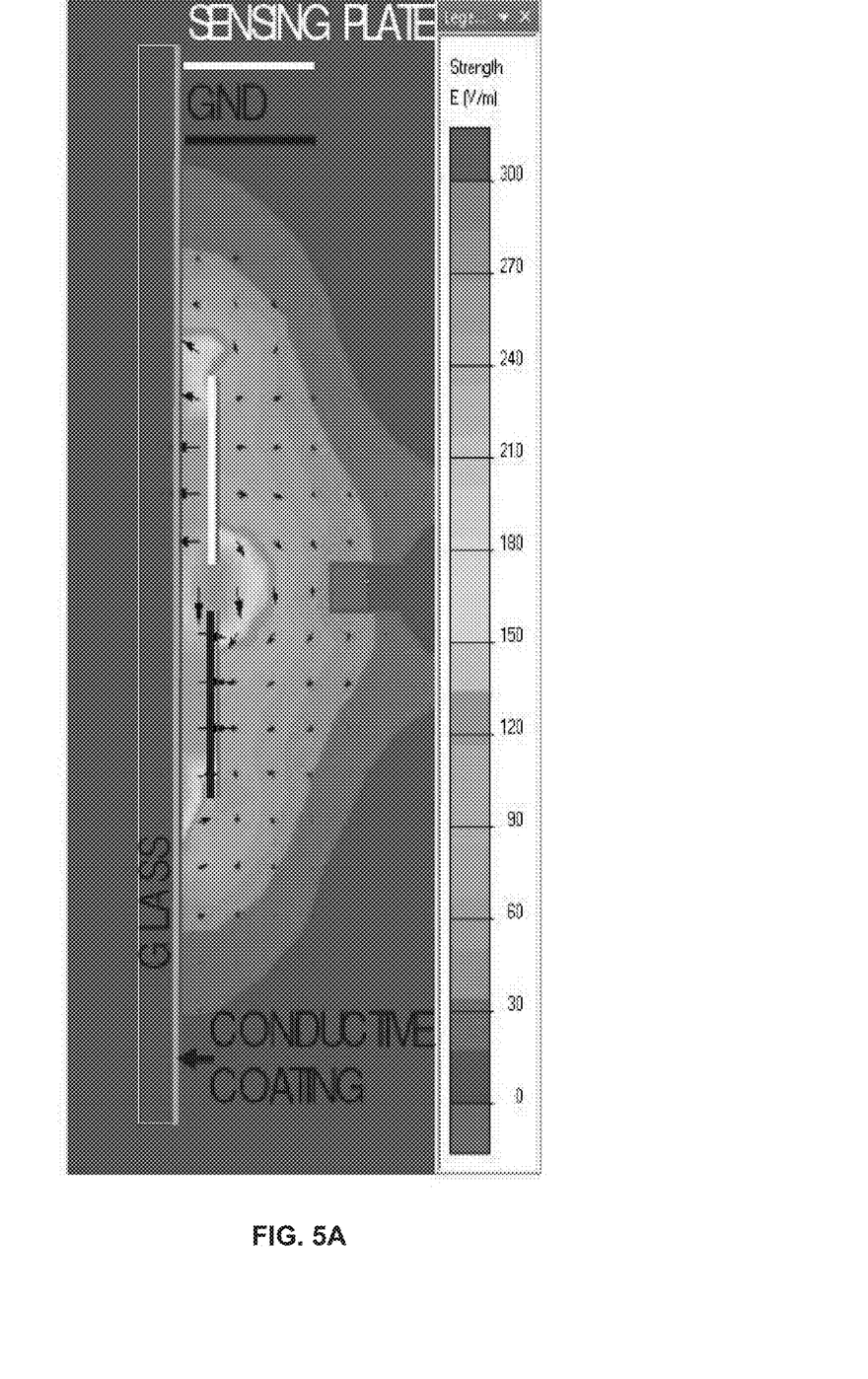
FIG. 5A. Image showing strength E (V/m) for a capacitive-sensing device, where the electrical field is significantly less affected by the finger than by the hand; the charge increase on the sensing plate and the ground system is reduced, thereby creating a more consistent baseline capacitance from user to user.
Figure 5B:
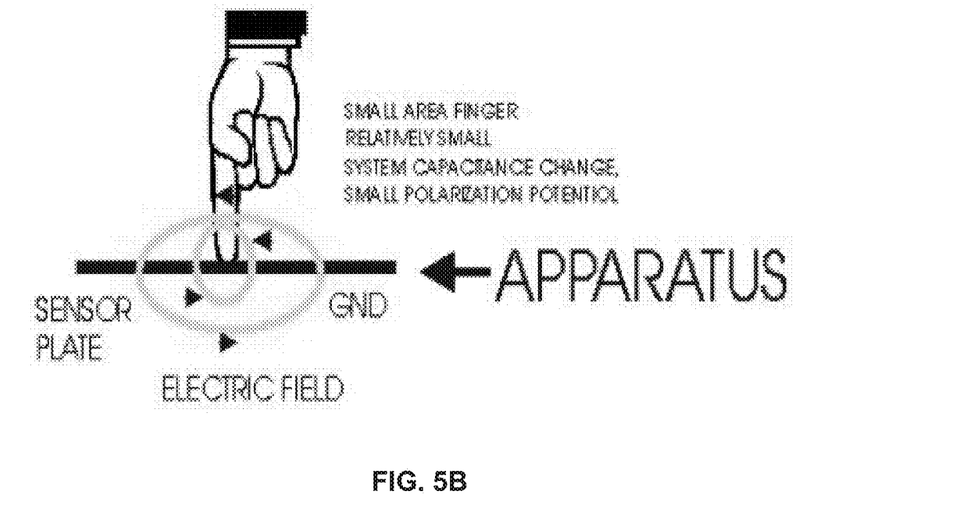
FIG. 5B: Schematic illustration of a finger holding a capacitive-sensing device against a medium.

FIG. 5A is an image showing strength E (V/m) where the electrical field is significantly less affected by a finger than by the hand. The charge increases on the capacitive sensing plate 20 and the ground system is reduced, thereby creating a more consistent baseline capacitance from user to user. FIG. 5B is a schematic illustration of a finger holding a capacitive-sensing device 10, showing how a smaller finger area causes a relatively smaller system capacitance change due to a small polarization change.

Figure 6:
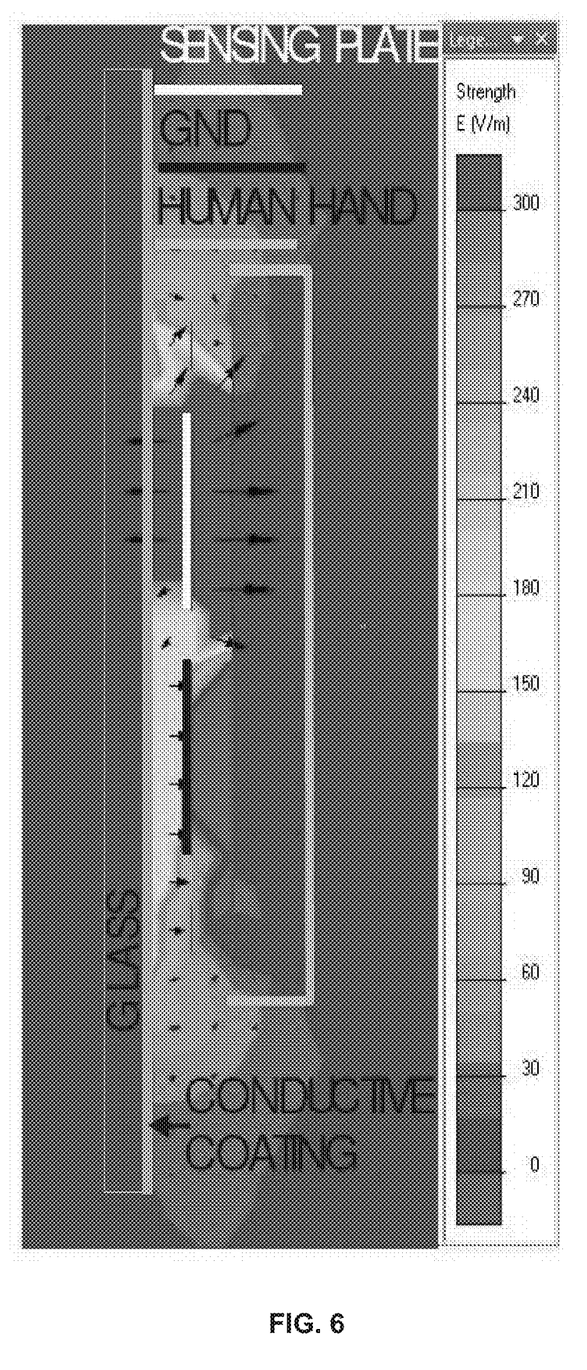
FIG. 6: Image showing strength E (V/m) where fingers of a hand are wrapped around the end of a capacitive-sensing device, where the fingers are wrapped around an end with a ground based shield between the hand and the signal plate and ground, thereby creating a more consistent baseline capacitance from user to user.

FIG. 6 shows an image showing strength E (V/m) where fingers of a hand are wrapped around the end of a capacitive-sensing device 10 with a ground based shield between the hand that the signal plate and ground, thereby creating a more consistent baseline capacitance from user to user.

Figure 7:
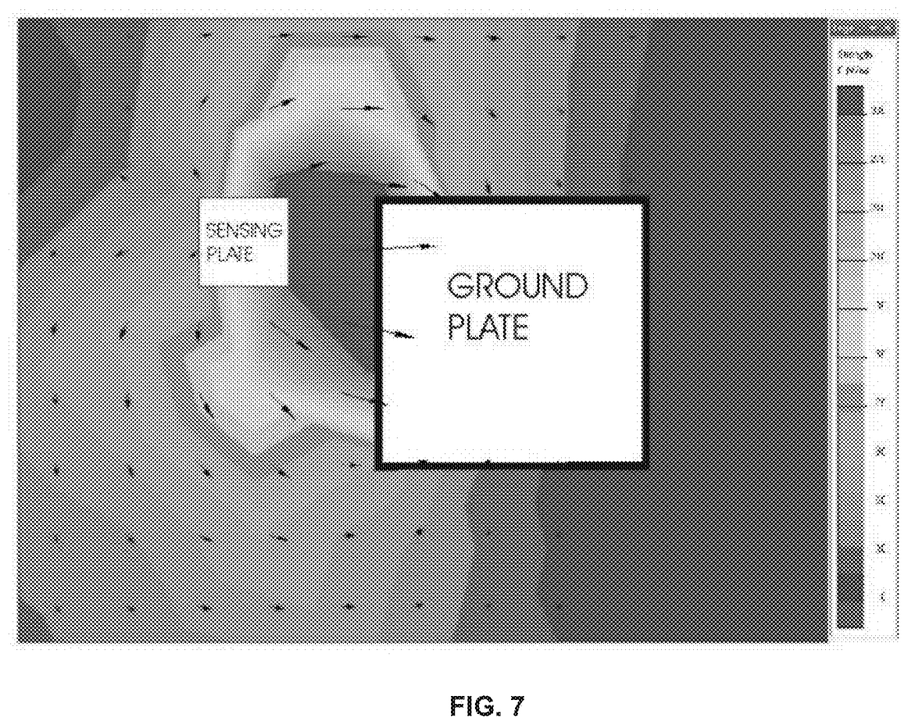
FIG. 7: Image showing electric field of capacitance system being focused toward a smaller isolated plate. If the small sensing plate is not below a hand, the systems capacitive response is significantly reduced.

In certain embodiments the device is configured to provide directional field control, as seen in FIG. 7. FIG. 7 provides an image showing the electric field of a capacitance system being focused toward a smaller sensing plate.

In such embodiments, the electrical field emanates from the actively driven sensing plate and must return to the system ground. If one or more of the capacitive sensing plate 20 or the ground system 22 is smaller relative to the other plate, the field will concentrate itself on the smaller plate and the system area affected by the electric field will be smaller. By geometrically directing the electrical field, the interaction with the holder of the device can be significantly reduced. A concentrated field strength covers the entire side of the smaller sensing plate and only part of the side of the larger ground plate.

In certain embodiments, the device is configured to provide field shaping. Referring now to FIG. 10C, a simplified schematic illustration shows a capacitive sensing plate 20 in the center of a ground system 22. In certain embodiments, the shape may be circular (see FIG. 10C) so the field emanates in all directions the same. By making a ground return ring 22 around the capacitive sensing plate 20, the field will return with the same strength in all directions. This limits the effect of the users placing themselves into the electrical field in different locations and affecting the strength of the field differently and thereby affecting the created field differently. In other embodiments, the capacitive sensing plate 20 may also be the outer ring or area and the ground system 22 in the center, thereby forcing the majority of the field to return to the center area and again limit field change differences that would be dependent upon how the user holds the sensing device.

In certain embodiments, the device is configured to provide field limiting. In such embodiments, a larger floating plate 26 is positioned behind the capacitive sensing plate 20, and part of the new capacitance value. Two plates in parallel with a voltage potential have a capacitance value, the addition of a third plate between them or in parallel forms other capacitors. In the embodiment shown, the floating plate example 26 forms a capacitance. The floating plate 26 will form a known offset capacitance value with the capacitive sensing plate 20 and ground system 20 that the capacitive sensing plate 20 is behind. Depending upon the size of the floating plate 26, relative to the size and location of the capacitive sensing plate 20 and the ground system 22, the capacitance formed will be a base offset and changes to the capacitance value due to the user holding the unit will be diminished because the user will be gripping the device behind the floating plate.

Figure 8:
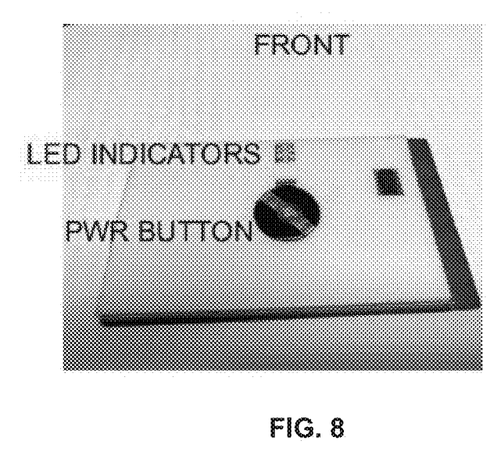
FIG. 8: Photograph of a front side of a capacitive-sensing device 10 described herein.
Figure 9:
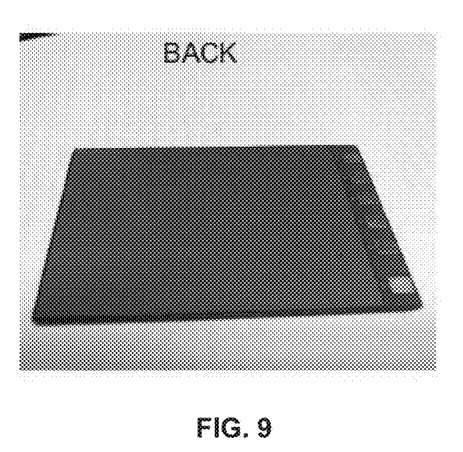
FIG. 9: Photograph of a back side of a capacitive-sensing device 10 described herein.

FIG. 8 is a photograph of a front side of a capacitive-sensing device 10 described herein. FIG. 9 is a photograph of a back side of a capacitive-sensing device 10 described herein.

Figure 10A:
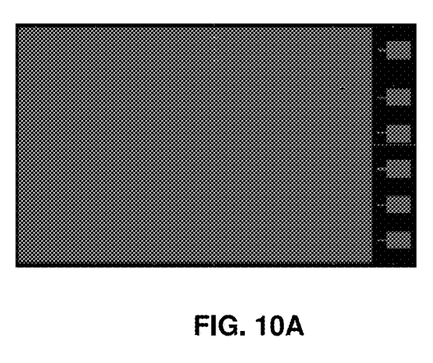
FIGS. 10A-10C: Images showing different configurations for a back side of a capacitive-sensing device 10 described herein: most of back (FIG. 10A); block-O (FIG. 10B); and, inner circle and outer ground circle (FIG. 10C).
Figure 10B:
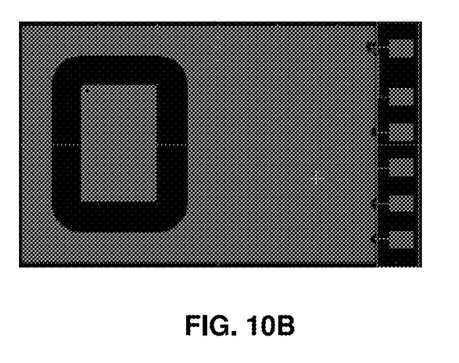
Figure 10C:
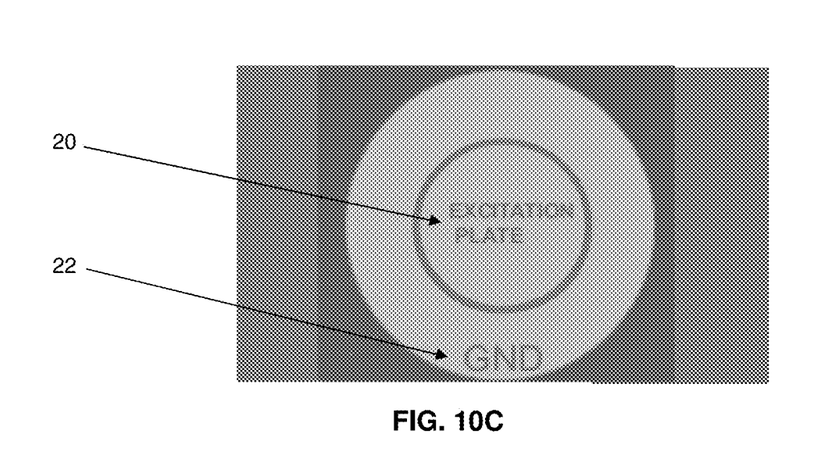

FIGS. 10A-10B are images showing different configurations for the front side of a capacitive-sensing device 10 described herein showing most of back (FIG. 10A); block-O (FIG. 10B). FIG. 10A shows the entire side is the capacitive sensing plate 20. The field must loop around to the back or parasitically couple from the person holding the device to get to the system ground plane. FIG. 10B shows the capacitive sensing plate 20 to the right or left side of the device. Most people are right or left handed so the majority of the hand will be to one side if you are pushing down in the center of the other side. Therefore, the majority of the bottom was the ground or return for the field and the isolated box/square sensing plate was moved to one side to be as far away from a human finger and hand as possible.

Figure 11:
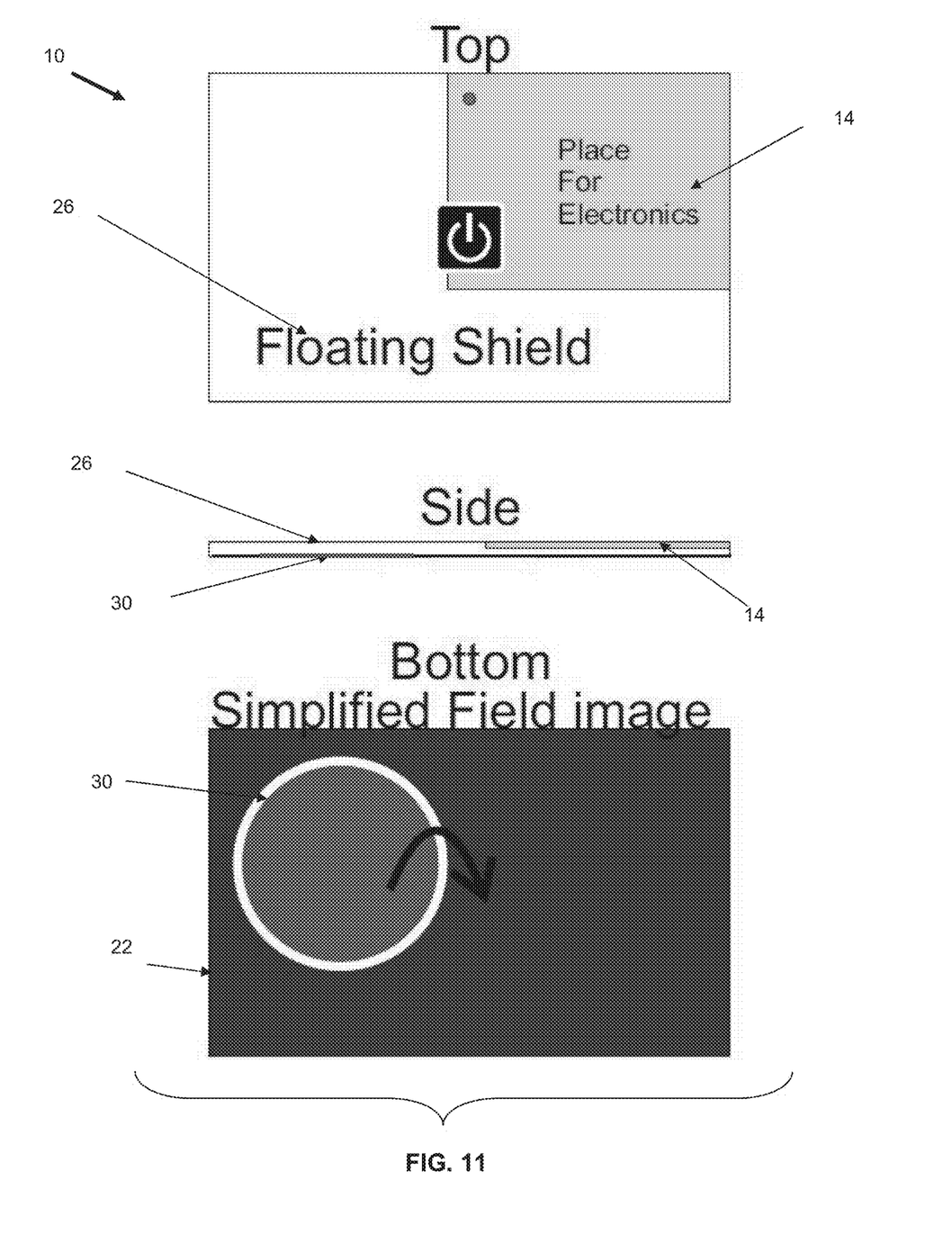
FIG. 11. Schematic illustrations of a top, side and bottom of a capacitive-sensing device.

FIG. 11 (top) provides another schematic illustration of a top view of a capacitive-sensing device 10 having a floating shield 26 and a place for electronics 14. FIG. 11 (Bottom) provides a schematic illustration of a bottom view of the capacitive-sensing device 10 having a simplified field image 30. FIG. 11 (middle) shows the side view shows the relationship between the floating shield 26 and the field image 30 and the ground plate 22.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What we claim is:

1. A device (10) for accounting for environmental capacitances caused by an external object when detecting the presence and surface location of an electrically conductive coating on a transparent and/or translucent medium in a single- or multi-pane assembly, comprising:
   a) a capacitive sensor (12) configured for positioning against a surface of the single- or multi-plane assembly; the capacitive sensor (12) being configured to provide one or more of:
      i) a first capacitance in the absence of a conductive coating on any of the medium,
      ii) a second capacitance if a conductive coating is present on a far medium surface,
      iii) a third capacitance if a conductive coating is present on a near medium surface, and
      iv) a fourth capacitance if the device is contacting the conductive coating or on the nearest surface of the medium;
   b) sensing electronics (14) configured to be responsive to the first, second, third and/or fourth capacitances at the capacitive sensor (12);
   c) an excitation source (16) configured to generate a train of pulses, voltage or current which is used to determine capacitances at the capacitive sensor (12);
   d) a selective indicator device (18) that is responsive to the capacitive change that affects the capacitive sensing process, the selective indicator (18) being configured to indicate the location of the conductive coating while accounting for environmental capacitances caused between an external object and the conductive coating or the sensing electronics (14);
   e) at least one capacitive sensing plate (20) configured to affect, or be affected by, the pulses, voltage or current from the excitation source (16);
   f) a ground system (22), positioned near the conductive capacitive sensing plate (20); and,
   g) an active shield (24) positioned around, within, behind or near the capacitive sensing plate (20); whereby the active shield (24) forms an electrical field shape between the capacitive sensing plate (20) and the ground system (22);
   whereby electric field caused by the interaction between the external object and a generated electric field from the capacitive plate (20) and the excitation source (16) polarize the medium and the external object that is within the electric field; and,
   whereby the electric fields are affected, such that the presence and location of the conductive coating is determined without excessive influence from the environmental capacitances caused by the external object.

2. The device of claim 1, wherein the device (10) is configured to provide directional field control where the electrical field emanating from the capacitive sensing plate (20) returns to the ground system (22).

3. The device of claim 1, wherein the device (10) is configured to provide field shaping when the capacitive sensing plate (20) is positioned within the ground system (22).

4. The device of claim 3, wherein the capacitive sensing plate (20) is circular so the field emanates in all directions the same.

5. The device of claim 4, wherein the ground system (22) is in a ring shape around the capacitive sensing plate (20) so the field returns generally with the same strength in all directions.

6. The device of claim 1, further including one or more floating shields (26) positioned around, within, behind or near the capacitive sensing plate (20).

7. The device of claim 1, wherein the device 10 is configured to provide field limiting where a fixed voltage is applied to the shield (24), wherein the shield is around, within, behind or near the capacitive sensing plate (20).

8. The device of claim 1, wherein the device (10) is configured to provide field limiting where a floating shield (26) is positioned around, within, behind or near the ground system (22).

9. The device of claim 1, wherein the device (10) includes additional sensing plates (20) that are isolated from the at least one capacitive sensing plate (20),
   wherein one or more of the additional capacitive sensing plates (20) reads the effect of the environment and are configured to remove or reduce that affect electrically or by software computation.

10. The device of claim 1 where the shield (24) is shaped to affect the capacitive sensing process through field shaping.

11. A method of accounting for environmental capacitances caused by an external object when differentiating surface location of an electrically conductive coating on a transparent and/or translucent medium, comprising:

a) generating a train of pulses, voltage or current from an electrical force from an excitation source to supply a charge to an isolated capacitive sensing plate and a ground system positioned near the isolated capacitive sensing plate;

b) determining capacitances by providing one or more of:
   i) a first capacitances in the absence of a conductive coating on any of the medium,
   ii) a second capacitance if a conductive coating is present on a far medium surface,
   iii) a third capacitance if a conductive coating is present on a near medium surface, and
   iv) a fourth capacitance if the device is contacting the coating or on the nearest surface of the medium;
   wherein indicator electronics are responsive to the first, second, third and/or fourth capacitances;

wherein a selective indicator device responds to the capacitive change that affects the capacitive sensing process and indicates the location of the conductive coating while accounting for environmental capacitances caused between the external object and the conductive coating or sensing electronics;

wherein electric field caused by the interaction between the external object and a generated electric field from the capacitive plate and the excitation source polarize the medium and the external object that is within the electric field; and wherein the electric fields are affected, such that the presence and location of the conductive coating is determined without influence from the environmental capacitances caused by the external object; and, c) shielding the capacitances being determined in order to remove or reduce any effect of the external object that capacitively couples back and affects the capacitances being determined.

12. The method of claim 11, further comprising sourcing or sinking a known current and/or voltage such that an electrical field is formed between the capacitive sensing plate and the conductive coating;
   wherein the electrical field forms a baseline capacitance value; and
   wherein when held or confined by a user, a new baseline capacitance value maybe formed.

13. The method of claim 12, wherein as more charges join the capacitive sensing plate and ground system, these charges build up an electric field that oppose any further increase in charge density.

14. The method of claim 13, wherein the net force is zero and the charges stay in equilibrium.

15. The method of claim 13, wherein, when the capacitive sensing plate and ground system have the same potential difference as a voltage source, the capacitance is defined as the ability of a body to store an electric charge.

16. The method of claim 11, wherein a created electric field/s are used to polarize the medium/s along with everything else within the electric field, thus affecting the electric field to determine the presence and location of conductive coating/s.

17. The method of claim 11, wherein no medium is required to be present in order to form a further capacitance; and wherein trigger values are determined that define the location and presence of conductive coatings on the medium.

* * * * *